(12) United States Patent
Smart et al.

(10) Patent No.: US 8,748,046 B2
(45) Date of Patent: Jun. 10, 2014

(54) LITHIUM-ION ELECTROLYTES WITH FLUOROESTER CO-SOLVENTS

(75) Inventors: Marshall C. Smart, Studio City, CA (US); Ratnakumar V. Bugga, Arcadia, CA (US); G. K. Surya Prakash, Hacienda Heights, CA (US); Kiah Smith, South Pasadena, CA (US); Pooja Bhalla, Hercules, CA (US)

(73) Assignees: California Institute of Technology, Pasadena, CA (US); University of Southern California, Los Angeles, CA (US)

( * ) Notice: Subject to any disclaimer, the term of this patent is extended or adjusted under 35 U.S.C. 154(b) by 863 days.

(21) Appl. No.: 12/011,462

(22) Filed: Jan. 25, 2008

(65) Prior Publication Data

US 2008/0305401 A1 Dec. 11, 2008

Related U.S. Application Data

(60) Provisional application No. 60/897,316, filed on Jan. 25, 2007.

(51) Int. Cl.
*H01M 6/16* (2006.01)
*H01M 6/04* (2006.01)

(52) U.S. Cl.
USPC ............ 429/326; 429/188; 429/189; 429/324

(58) Field of Classification Search
None
See application file for complete search history.

(56) References Cited

U.S. PATENT DOCUMENTS

| 6,541,140 B1* | 4/2003 | Spillman et al. | 429/3 |
| 2002/0192564 A1* | 12/2002 | Ota et al. | 429/324 |
| 2006/0078792 A1* | 4/2006 | Kim et al. | 429/200 |

OTHER PUBLICATIONS

Ehrlich, "Lithium Ion Batteries," in Linden et al. Handbook of Batteries, 3rd ed., chapter 35, New York: McGraw-Hill, 2002.*
Smart et al., "Aliphatic ester electrolyte additives for lithium-ion cells". NASA Tech Briefs, Jun. 2001. FindArticles.com. http://findarticles.com/p/articles/mi_qa3957/is_200106/ai_n8977122/, accessed Sep. 23, 2009.*
Aurbach et al., Electrochimica Acta 47, p. 1423-1439, Feb. 2002.*
Machine translation of JP 10-116627, Shoji et al., May 6, 1998.*
Machine translation of JP 08-298134, Ata et al., Nov. 12, 1996.*

* cited by examiner

*Primary Examiner* — Kwang Han
(74) *Attorney, Agent, or Firm* — Gates & Cooper LLP (57) ABSTRACT

An embodiment lithium-ion battery comprising a lithium-ion electrolyte of ethylene carbonate; ethyl methyl carbonate; and at least one solvent selected from the group consisting of trifluoroethyl butyrate, ethyl trifluoroacetate, trifluoroethyl acetate, methyl pentafluoropropionate, and 2,2,2-trifluoroethyl propionate. Other embodiments are described and claimed.

30 Claims, 10 Drawing Sheets

LITHIUM-ION ELECTROLYTES WITH FLUOROESTER CO-SOLVENTS

PRIORITY CLAIM

This application claims the benefit of U.S. Provisional Application No. 60/897,316, filed 25 Jan. 2007.

GOVERNMENT INTEREST

The invention claimed herein was made in the performance of work under a NASA contract, and is subject to the provisions of Public Law 96-517 (35 USC 202) in which the Contractor has elected to retain title.

FIELD

The present invention relates to lithium-ion electrolytes, with application to lithium-ion batteries.

BACKGROUND

Future NASA missions to explore Mars, the Moon, and the outer planets, are expected to require rechargeable batteries that can operate over a wide temperature range (−60° C. to +60° C.) to satisfy the requirements of various applications, including landers, rovers, and penetrators. Some future applications typically may require high specific energy batteries that can operate at very low temperatures, while still providing adequate performance and stability at higher temperatures. In addition, many of these applications envisioned by the Exploration Systems Research and Technology (ESRT) program of NASA will require improved safety, due to their use by humans. The performance of currently known state-of-art lithium-ion systems is severely limited at temperatures below −40° C. and above +30° C. The limited performance at very low temperatures is believed to be due to poor electrolyte conductivity, poor lithium intercalation kinetics over the electrode surface layers, and poor ionic diffusion in the electrode bulk.

DESCRIPTION OF EMBODIMENTS

In the description that follows, the scope of the term "some embodiments" is not to be so limited as to mean more than one embodiment, but rather, the scope may include one embodiment, more than one embodiment, or perhaps all embodiments.

Figure 1:
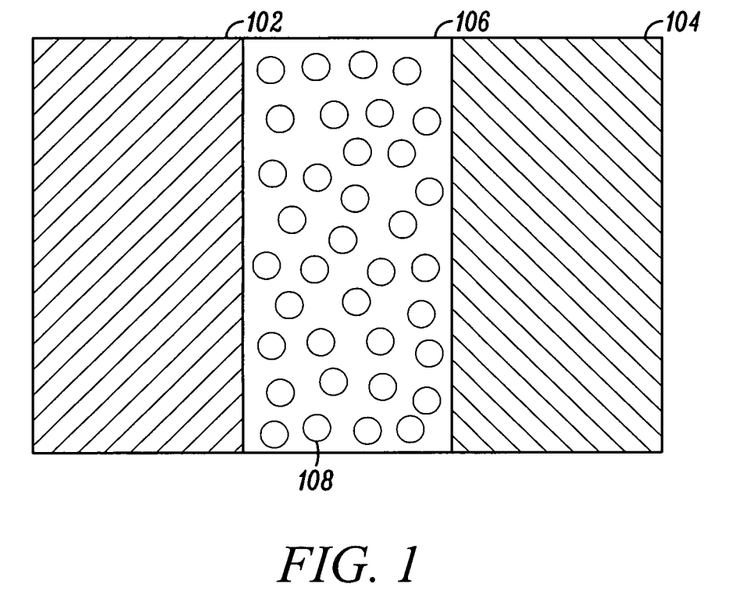
FIG. 1 illustrates a battery according to an embodiment.

FIG. 1 illustrates in a simplified pictorial fashion a portion of a lithium-ion battery according to an embodiment, comprising anode 102, cathode 104, and separator 106 with an electrolyte comprising lithium ions 108 that move through separator 106 from anode 102 to cathode 104 during a battery discharge, and from cathode 104 to anode 102 during a battery charge. For some batteries with a cylindrical form factor, another separator layer may be adjacent to cathode 104, and all four layers may be wound into a cylindrical form. However, embodiments are not limited to any particular form factor.

For some embodiments, anode 102 comprises MCMB (Mesocarbon Microbeads) carbon, and cathode 104 comprises $LiNi_{0.8}CO_{0.2}O_2$ (lithium nickel cobalt oxide). Other embodiments may use other kinds of anodes or cathodes. For example, other embodiments may use cathodes comprising lithium cobalt oxide ($LiCoO_2$), lithium manganese oxide ($LiMn_2O_4$), lithium nickel cobalt aluminum oxide ($LiNiCoAlO_2$), lithium iron phosphate ($LiPO_4$), and lithium nickel cobalt manganese oxide ($LiNiCoMnO_2$), and $LiFePO_4$ to name a few examples. As another example, the stoichiometries for nickel, cobalt, and manganese may vary, so that for some embodiments a cathode may comprise $LiMn_xO_4$ and $LiNi_yCo_zMn_uO_2$, where x, y, z, and u denote variable stoichiometries.

The lithium-ion electrolyte solution comprises a lithium salt, such as lithium hexafluoro phosphate ($LiPF_6$), dissolved into a co-solvent to provide a lithium-ion electrolytic solution (electrolyte). Other embodiments may use other types of lithium salt, such as lithium tetrafluoroborate ($LiBF_4$), lithium bis(oxalate) borate (LiBOB, or $LiB(C_2O_4)_2$), lithium hexafluoroarensate ($LiAsF_6$), lithium perchlorate ($LiClO_4$), lithium trifluoromethanesulfonate ($LiCF_3SO_3$), and lithium bistrifluoromethanesulfonate sulfonyl imide ($LiN(SO_2CF_3)_2$), to name a few. Also, some embodiments may utilize a mixture of such lithium salts.

During discharge, the reaction $CLi_x \rightarrow C + Li^+ + xe^-$, where $e^-$ denotes an electron, takes place at anode 102, and the reaction $xLi^+ + xe^- + Li_{1-x}Ni_{0.8}Cu_{0.2}O_2 \rightarrow LiNi_{0.8}CO_{0.2}O_2$ takes place at cathode 104 (for an embodiment with a cathode comprising $LiNi_{0.8}Cu_{0.2}O_2$). During charge, these reactions are reversed.

A number of ternary co-solvent embodiments were investigated comprising ethylene carbonate (EC), ethyl methyl carbonate (EMC), and a fluoroester (also referred to as fluorinated ester) solvent selected from the group consisting of 2,2,2-trifluoroethyl butyrate ($C_6H_9F_3O_2$ or $CH_3CH_2CH_2CO_2CH_2CF_3$), Chemical Abstract Services registry number CAS #371-27-7, abbreviated in these letters patent as TFEB; ethyl trifluoroacetate ($C_4H_5F_3O_2$, or $CF_3CO_2CH_2CH_3$), CAS #383-63-1, abbreviated in these letters patent as ETFA; 2,2,2-trifluoroethyl acetate ($C_4H_5F_3O_2$, or $CH_3CO_2CH_2CF_3$), CAS #406-95-1, abbreviated in these letters patent as TFEA; and methyl pentafluoropropionate ($C_4H_3F_5O_2$, or $CF_3CF_2CO_2CH_3$), CAS#378-75-6, abbreviated in these letters patent as MPFP. In particular, these co-solvents were blended in carbonate-based electrolytes to give the following electrolyte solutions:

1.0 M $LiPF_6$ in EC+EMC+TFEB (20:60:20 v/v %);
1.0 M $LiPF_6$ in EC+EMC+TFEB (20:40:40 v/v %);
1.0 M $LiPF_6$ in EC+EMC+TFEB (20:20:60 v/v %);
1.0 M $LiPF_6$ in EC+EMC+ETFA (20:60:20 v/v %);
1.0 M $LiPF_6$ in EC+EMC+TFEA (20:60:20 v/v %);
1.0 M $LiPF_6$ in EC+EMC+TFEA (20:40:40 v/v %); and
1.0 M $LiPF_6$ in EC+EMC+MPFP (20:60:20 v/v %).

A number of experimental glass wound (cylindrical) lithium-ion cells, with MCMB carbon anodes and $LiNi_{0.8}CO_{0.2}O_2$ cathodes, with Li metal reference electrodes, were fabricated to study the above listed electrolytes. Results of those experiments are provided in Table 1. The last two entries in Table 1 are electrolytes comprising 1.0 M $LiPF_6$ in EC+EMC (20:80 v/v %); and 1.0 M $LiPF_6$ in EC+DEC (diethyl carbonate)+DMC (dimethyl carbonate) (1:1:1 v/v %). These two electrolytes serve as baselines for comparison.

TABLE 1

Charge-discharge characteristics of experimental lithium-ion cells containing various electrolytes subjected to formation cycling.

| Electrolyte Type | Charge Capacity (Ah) 1st Cycle | Discharge Capacity (Ah) 1st Cycle | Irreversible Capacity (1st Cycle) | Couloumbic Efficiency (1st Cyle) | Charge Capacity (Ah) 5th Cycle | Reversible Capacity (Ah) 5th Cycle | Cummulative Irreverisible Capacity (1st-5th Cycle) | Couloumbic Efficiency (5th Cycle) |
|---|---|---|---|---|---|---|---|---|
| 1.0 M LiPF6 EC + EMC (20:80 v/v %) | 0.4216 | 0.3334 | 0.088 | 79.08 | 0.3341 | 0.3266 | 0.1241 | 97.76 |
| 1.0 M LiPF6 EC + DEC + DMC (1:1:1 v/v %) | 0.47882 | 0.41059 | 0.068 | 85.75 | 0.41169 | 0.39789 | 0.1313 | 96.65 |
| 1.0 M LiPF6 EC + EMC + TFEA (20:60:20 v/v %) | 0.39576 | 0.29202 | 0.104 | 73.79 | 0.31029 | 0.30345 | 0.1430 | 97.80 |
| 1.0 M LiPF6 EC + EMC + TFEA (20:40:40 v/v %) | 0.42394 | 0.30787 | 0.116 | 72.62 | 0.32546 | 0.31174 | 0.2790 | 95.78 |
| 1.0 M LiPF6 EC + EMC + TFEB (20:60:20 v/v %) | 0.51793 | 0.44202 | 0.076 | 85.34 | 0.43826 | 0.43123 | 0.1140 | 98.40 |
| 1.0 M LiPF6 EC + EMC + TFEB (20:40:40 v/v %) | 0.53078 | 0.44252 | 0.088 | 83.37 | 0.44440 | 0.43290 | 0.1465 | 97.41 |
| 1.0 M LiPF6 EC + EMC + TFEB (20:20:60 v/v %) | 0.42751 | 0.30552 | 0.122 | 71.47 | 0.29636 | 0.28616 | 0.1875 | 96.56 |
| 1.0 M LiPF6 EC + EMC + ETFA (20:60:20 v/v %) | 0.48459 | 0.35629 | 0.128 | 73.53 | 0.34877 | 0.33726 | 0.1894 | 96.70 |
| 1.0 M LiPF6 EC + EMC + MPFP (20:60:20 v/v %) | 0.48023 | 0.29415 | 0.186 | 61.25 | 0.21281 | 0.18844 | 0.3255 | 88.55 |

As shown in Table 1, all cells displayed good reversibility at room temperature and minimal reactivity during the formation cycling, with the exception of the cell containing the MPFP-based electrolyte. The high coulmbic efficiency and comparable irreversible capacity losses are indirectly related to the overall stability of the solutions and the electrode filming characteristics. Note that the fluoroester-based solutions do not display deleterious effects that may limit the reversible capacity or may hinder the kinetics of the lithium intercalation and de-intercalation processes. In some cases, some cells displayed much higher efficiencies and lower cumulative irreversible capacity losses, such as the cells containing TFEB in low proportion, compared with the comparable baseline solution.

Figure 2:
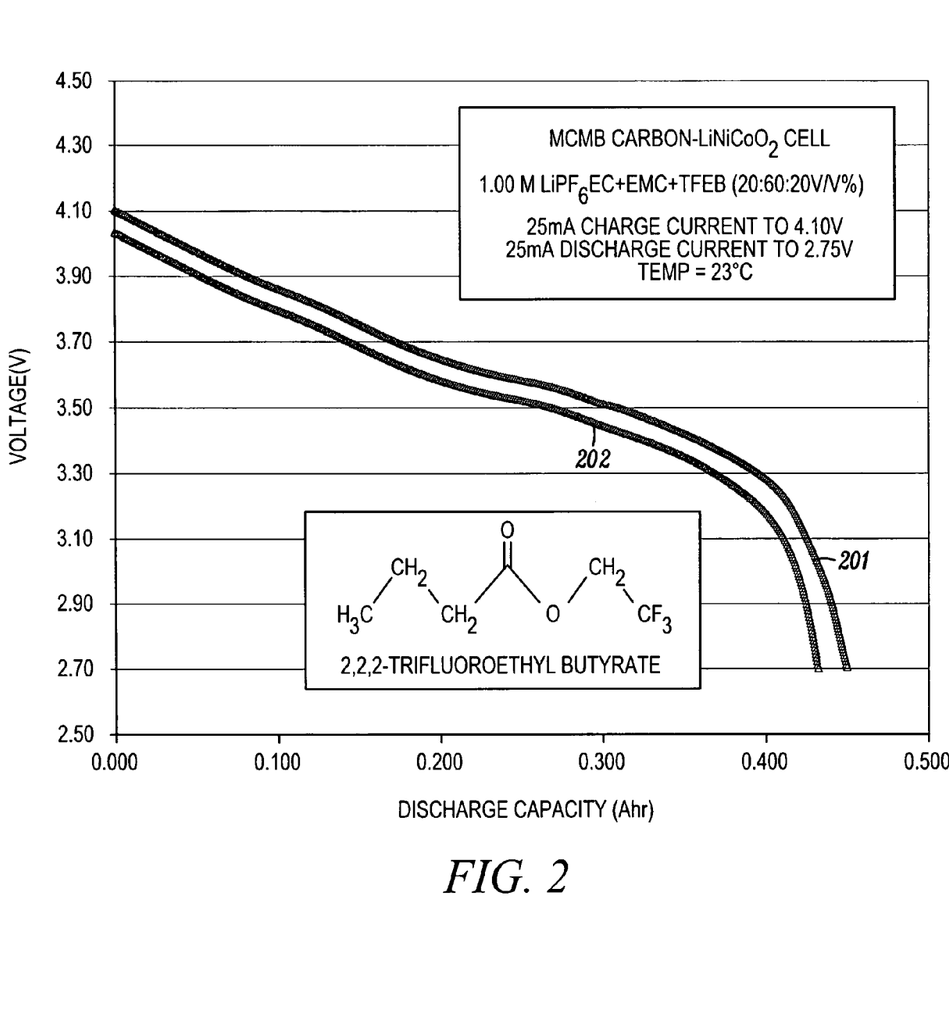
FIGS. 2-10 illustrate discharge curves of embodiments.

Of the electrolytes listed above, the embodiment formulations comprising 1.0 M $LiPF_6$ in EC+EMC+TFEB (20:60:20 v/v %) and 1.0 M $LiPF_6$ in EC+EMC+TFEA (20:60:20 v/v %) yielded the greatest improvements in terms of performance, resulting in improved low temperature performance and greater high temperature resilience. As shown in FIG. 2, good reversibility was observed with the cell containing the 1.0 M $LiPF_6$ EC+EMC+TFEB (20:60:20 v/v %) electrolyte, being comparable with the baseline 1.0 M $LiPF_6$ electrolyte formulation. In FIG. 2, curve 201 shows voltage vs. discharge capacity (in Ampere-hour units) for the first discharge cycle, and curve 202 shows this relationship for the fifth discharge cycle. A 25 mA current was used to charge the cell to 4.10 V, and discharge was at 25 mA to 2.75 V, all at a room temperature of 23° C.

Figure 3:
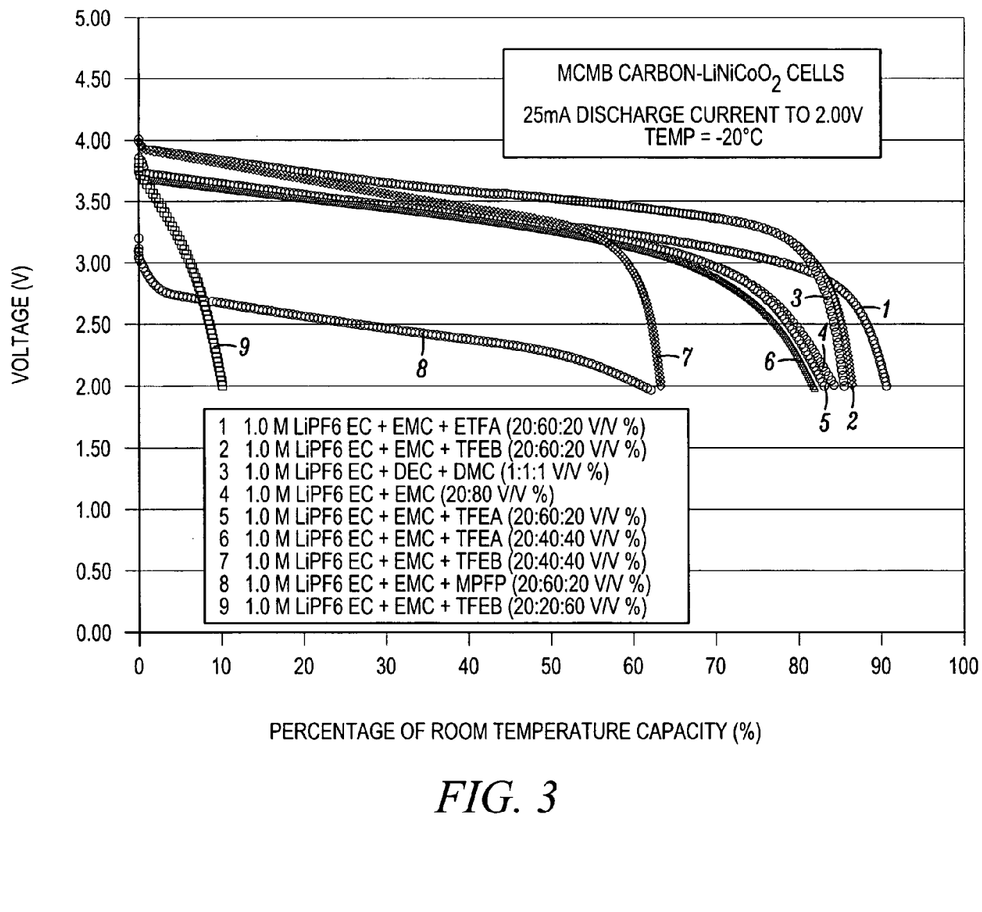

FIG. 3 provides discharge curves for the above listed electrolytes at a temperature of −20° C., for a 25 mA discharge current to 2.00 V. The key to the curves is shown as an inset in FIG. 3. FIG. 3 shows good low temperature performance with the cells containing the ethyl trifluoroacetate (ETFA) and trifluoroethyl butyrate (TFEB) co-solvents when used in 20 vol % compared with the ternary carbonate baseline, with over 85% of the room temperature capacity being delivered at −20° C. using moderate rates (a discharge rate of approximately C/16). The performance enhancement of these electrolytes is more dramatic when compared to the binary baseline formulation of comparable EC-content, especially with respect to the degree of polarization observed with the TFEB-containing solution.

Figure 4:
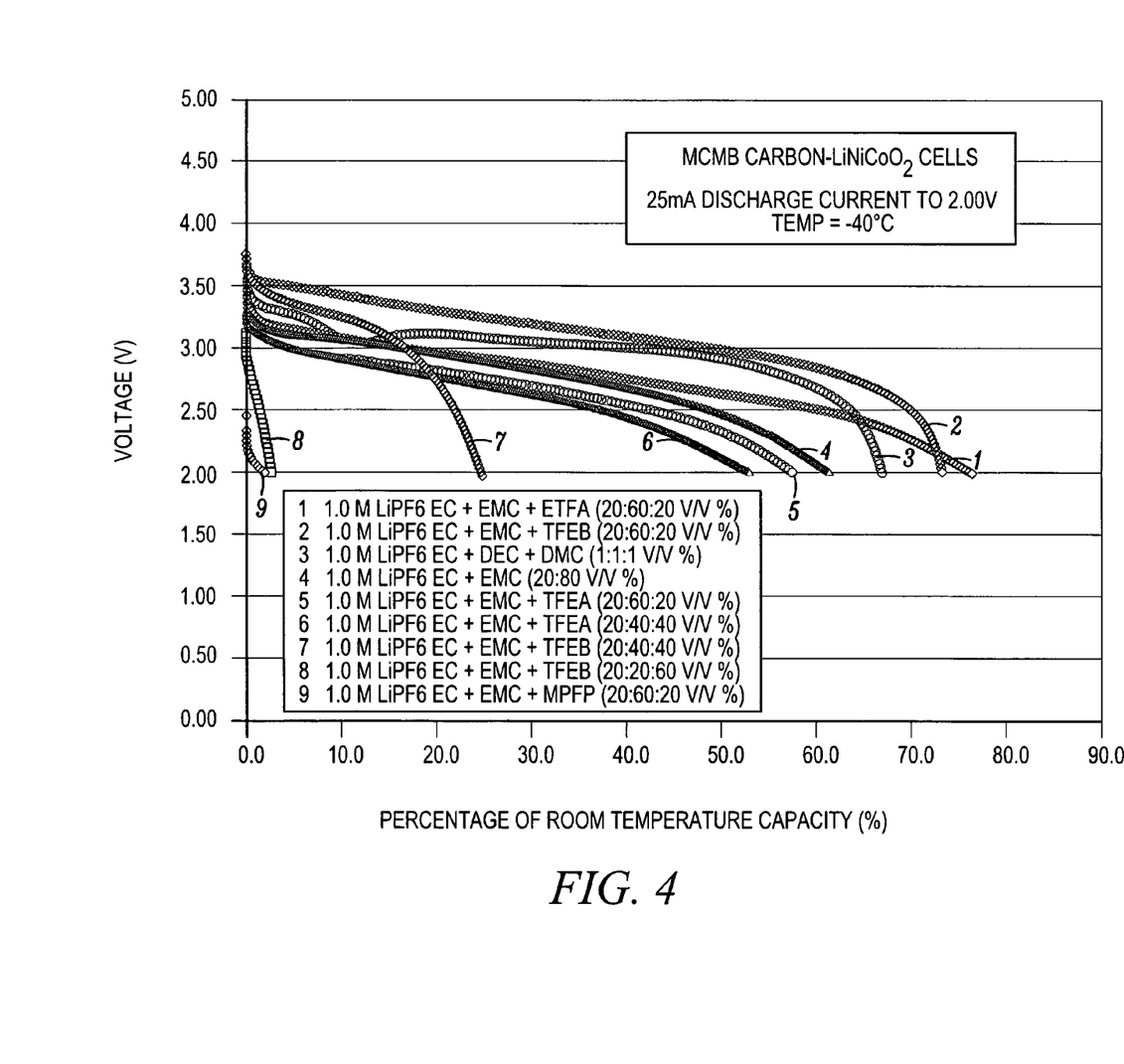

The cells were evaluated at the lower temperature of −40° C., as shown in FIG. 4. Excellent performance was again obtained with the cells containing the ethyl trifluoroacetate (ETFA) and trifluoroethyl butyrate (TFEB) co-solvents with over 70% of the room temperature capacity being delivered at a discharge rate of approximately C/16. Again, for embodiments with the TFEB-containing electrolyte, much less polarization was observed compared to the baseline, with a higher operating voltage throughout the discharge.

Figure 5:
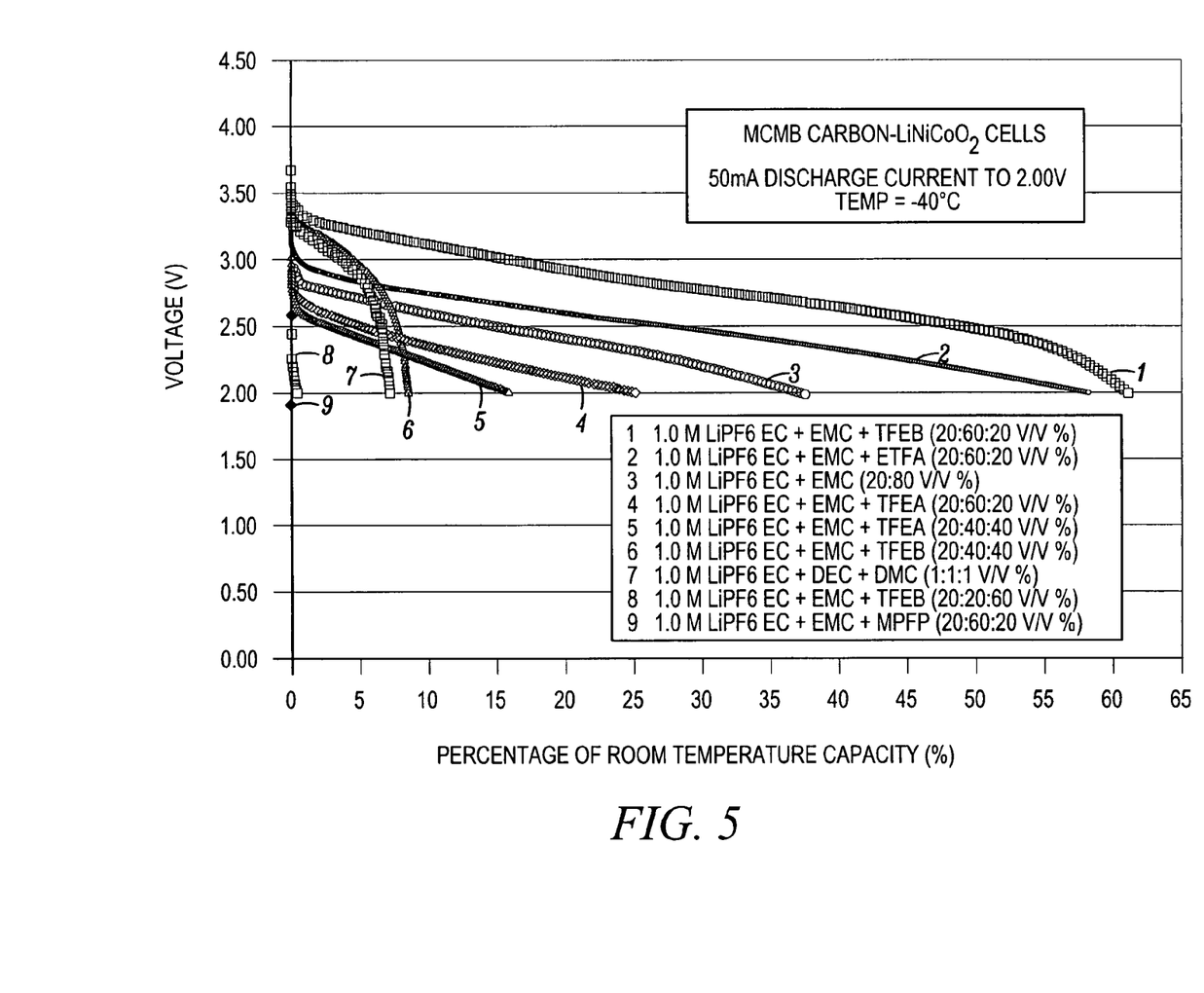

FIG. 5 provides discharge curves for the cells evaluated at −40° C., but using higher discharge rates (corresponding to a discharge rate of about C/8). The cell containing the TFEB in 20 vol % proportion dramatically outperformed all other cells, displaying over a six-fold increase in capacity when compared to the ternary baseline electrolyte. This dramatic improvement, in terms of overall capacity delivered and the extent of polarization observed, was also observed relative to the binary baseline composition with comparable EC-content, clearly demonstrating a beneficial effect of the fluoroester co-solvent upon the low temperature performance. (So as not to obscure the axes and other curves, in FIG. 5 only a few data points are shown for curve 9.)

Figure 6:
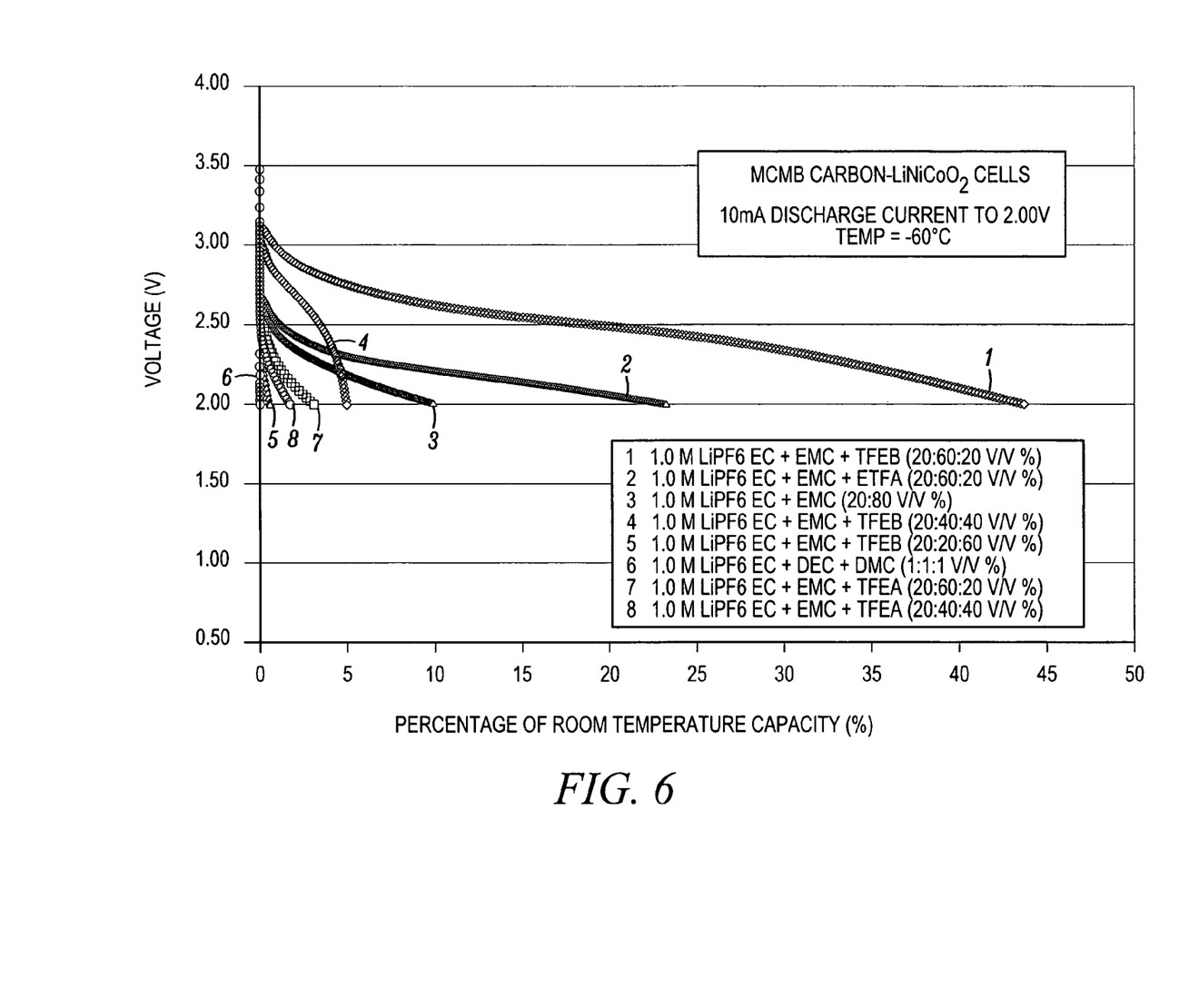

FIG. 6 provides discharge curves evaluated at −60° C. using lower discharge rates (corresponding to a discharge rate of about C/30). The cell containing the TFEB in 20 vol % proportion again dramatically outperformed all other cells, displaying over a four-fold increase in capacity when compared to the binary baseline electrolyte. In contrast, the ternary baseline electrolyte delivered negligible capacity, since the higher EC-content present in this formulation results in lower ionic conductivity due to the higher viscosity at these temperatures.

As seen from FIGS. 2-6, embodiments with ethyl trifluoroacetate (ETFA) and trifluoroethyl butyrate (TFEB) co-solvents have been demonstrated to result in enhanced performance at low temperature compared with all-carbonate-based electrolyte baseline formulations. These results are summarized in Tables 2A, 2B, and 2C. It is believed that these results may presumably be due to the favorable physical properties of the fluoroester co-solvents coupled with desirable film-forming characteristics at the electrode-electrolyte interface, resulting in improved lithium kinetics. This has been indirectly confirmed by electrochemical characterization of the cells, including electrochemical impedance spectroscopy, Tafel polarization measurements, and linear polarization measurements.

TABLE 2C

Low Temperature Discharge Performance of MCMB-LiNiCoO$_2$ cells comprising fluoroester-based electrolytes.

| TEMP | Current (mA) | 1.0M LiPF6 EC + EMC (20:80 v/v %) | | 1.0M LiPF6 EC + DEC + DMC (1:1:1 v/v %) | |
|---|---|---|---|---|---|
| | | Capacity (Ahr) | % | Capacity (Ahr) | % |
| 23 C. | 25 | 0.3266 | 100 | 0.3979 | 100 |
| −20 C. | 25 | 0.2751 | 84.21 | 0.3399 | 85.43 |
| −20 C. | 50 | | | 0.3272 | 82.24 |
| −40 C. | 25 | 0.2023 | 61.93 | 0.2659 | 66.82 |
| −40 C. | 50 | 0.1217 | 37.27 | 0.0282 | 7.09 |
| −50 C. | 25 | 0.0736 | 22.54 | 0.0102 | 2.56 |
| −50 C. | 50 | | | 0.0001 | 0.02 |
| −60 C. | 5 | 0.1345 | 41.17 | 0.0063 | 1.58 |
| −60 C. | 10 | 0.0315 | 9.66 | 0.0000 | 0.01 |
| −60 C. | 25 | 0.0021 | 0.65 | 0.0000 | 0.00 |

In addition to evaluating the low temperature performance of the cells, the high temperature resilience of the cells was

TABLE 2A

Low Temperature Discharge Performance of MCMB-LiNiCoO$_2$ cells comprising fluoroester-based electrolytes.

| TEMP | Current (mA) | 1.0M LiPF6 EC + EMC + TFEB (20:60:20 v/v %) | | 1.0M LiPF6 EC + EMC + TFEB (20:40:40 v/v %) | | 1.0M LiPF6 EC + EMC + TFEB (20:20:60 v/v %) | | 1.0M LiPF6 EC + EMC + TFEA (20:60:20 v/v %) | |
|---|---|---|---|---|---|---|---|---|---|
| | | Capacity (Ahr) | % | Capacity (Ahr) | % | Capacity (Ahr) | % | Capacity (Ahr) | % |
| 23 C. | 25 | 0.4312 | 100 | 0.4329 | 100 | 0.3035 | 100 | 0.3117 | 100 |
| −20 C. | 25 | 0.3718 | 86.23 | 0.2727 | 63.00 | 0.2519 | 83.02 | 0.2544 | 81.59 |
| −20 C. | 50 | 0.3528 | 81.82 | 0.2314 | 53.45 | | | | |
| −40 C. | 25 | 0.3166 | 73.41 | 0.1064 | 24.57 | 0.1756 | 57.87 | 0.1657 | 53.17 |
| −40 C. | 50 | 0.2631 | 61.01 | 0.0364 | 8.40 | 0.0777 | 25.61 | 0.0518 | 16.61 |
| −50 C. | 25 | 0.2024 | 467.93 | 0.0347 | 8.02 | 0.0288 | 9.48 | 0.0208 | 6.66 |
| −50 C. | 50 | 0.0324 | 7.52 | 0.0155 | 3.58 | | | | |
| −60 C. | 5 | 0.2723 | 63.14 | 0.1084 | 25.03 | 0.0633 | 20.88 | 0.0456 | 14.64 |
| −60 C. | 10 | 0.1918 | 44.47 | 0.0210 | 4.85 | 0.0091 | 2.99 | 0.0055 | 1.75 |
| −60 C. | 25 | 0.0209 | 4.85 | 0.0080 | 1.84 | 0.0006 | 0.21 | 0.0002 | 0.08 |

TABLE 2B

Low Temperature Discharge Performance of MCMB-LiNiCoO$_2$ cells comprising fluoroester-based electrolytes.

| TEMP | Current (mA) | 1.0M LiPF6 EC + EMC + TFEA (20:40:40 v/v %) | | 1.0M LiPF6 EC + EMC + ETFA (20:60:20 v/v %) | | 1.0M LiPF6 EC + EMC + MPFP (20:60:20 v/v %) | |
|---|---|---|---|---|---|---|---|
| | | Capacity (Ahr) | % | Capacity (Ahr) | % | Capacity (Ahr) | % |
| 23 C. | 25 | 0.3117 | 100 | 0.3373 | 100 | 0.1884 | 100 |
| −20 C. | 25 | 0.2544 | 81.59 | 0.3051 | 90.48 | 0.1158 | 61.44 |
| −20 C. | 50 | | | 0.2764 | 81.97 | 0.0681 | 36.11 |
| −40 C. | 25 | 0.1657 | 53.17 | 0.2580 | 76.49 | 0.0038 | 2.02 |
| −40 C. | 50 | 0.0518 | 16.61 | 0.1983 | 58.79 | 0.0001 | 0.03 |
| −50 C. | 25 | 0.0208 | 6.66 | 0.1221 | 28.31 | 0.0023 | 1.22 |
| −50 C. | 50 | | | 0.0088 | 2.03 | 0.0000 | 0.01 |
| −60 C. | 5 | 0.04567 | 14.64 | 0.1749 | 40.55 | 0.0000 | 0.02 |
| −60 C. | 10 | 0.0055 | 1.75 | 0.0822 | 19.07 | 0.0000 | 0.00 |
| −60 C. | 25 | 0.0002 | 0.08 | 0.0018 | 0.41 | 0.0000 | 0.01 | tested by subjecting them to increasingly higher temperature storage periods. Each storage period consisted of storing the cells in a full state of charge for 10 days in an open circuit condition. Although it would be expected that the performance degradation is less pronounced if the cells are stored in a partial state of charge, a fully charged condition was selected for the test to accelerate any deleterious electrochemical electrolyte reactions. As illustrated in Tables 3A, 3B, and 3C, the cell containing the 1.0 M $LiPF_6$ in EC+EMC+TFEB (20:60:20 v/v %) electrolyte sustained the least amount of performance degradation as a result of the high temperature storage testing. For example, after being subjected to 10 days at 55° C., the TFEB-containing cells retained about 75% of the reversible capacity exhibited prior to the storage period, whereas the binary baseline formulation only delivered about 59% of their initial capacity.

TABLE 3A

Discharge performance of MCMB-$LiNiCoO_2$ cells comprising fluoroester-based electrolytes after being subjected to high temperature storage periods (55° C. to 65° C.).

|  |  |  | 1.0M LiPF6 EC + EMC + TFEA (20:60:20 v/v %) | | 1.0M LiPF6 EC + EMC + TFEA (20:40:40 v/v %) | | 1.0M LiPF6 EC + EMC (20:80 v/v %) | |
|---|---|---|---|---|---|---|---|---|
|  |  |  | Ah | % of initial | Ah | % of initial | Ah | % of initial |
| Prior to Storage Tests | 20 C. | 25 mA | 0.2810 | 100.00 | 0.2803 | 100.00 | 0.3032 | 100.00 |
|  |  | 50 mA | 0.26904 | 95.89 | 0.2633 | 93.91 | 0.2879 | 94.96 |
|  |  | 100 mA | 0.2591 | 92.23 | 0.2446 | 87.25 | 0.2695 | 88.90 |
| After 10 Days Storage at 55 C. | 20 C. | Residual | 0.1004 | 35.74 | 0.09550 | 19.61 | 0.1515 | 49.97 |
|  |  | 25 mA | 0.1355 | 48.22 | 0.1084 | 38.68 | 0.1794 | 59.17 |
|  |  | 50 mA | 0.1233 | 43.87 | 0.0959 | Q34.22 | 0.1713 | 56.50 |
|  |  | 100 mA | 0.1081 | 38.46 | 0.0764 | 27.25 | 0.1585 | 52.29 |

TABLE 3B

Discharge performance of MCMB-$LiNiCoO_2$ cells comprising fluoroester-based electrolytes after being subjected to high temperature storage periods (55° C. to 65° C.).

|  |  |  | 1.0M LiPF6 EC + EMC + TFEB (20:60:20 v/v %) | | 1.0M LiPF6 EC + EMC + TFEB (20:40:40 v/v %) | | 1.0M LiPF6 EC + EMCMPFP (20:60:20 v/v %) | |
|---|---|---|---|---|---|---|---|---|
|  |  |  | Ah | % of initial | Ah | % of initial | Ah | % of initial |
| Prior to Storage Tests |  | 20 C. | 25 mA | 0.3723 | 100.00 | 0.3589 | 100.00 | 0.1077 | 100.00 |
|  |  | 50 mA | 0.3656 | 98.22 | 0.3513 | 97.87 | 0.0907 | 84.20 |
|  |  | 100 mA | 0.3575 | 96.04 | 0.33760 | 93.89 | 0.0805 | 74.71 |
| After 10 Days Storage at 55 C. | 20 C. | Residual | 0.2463 | 66.16 | 0.2053 | 57.19 | 0.0173 | 16.05 |
|  |  | 25 mA | 0.2815 | 75.63 | 0.2594 | 72.28 | 0.0635 | 58.91 |
|  |  | 50 mA | 0.2740 | 73.61 | 0.2546 | 70.94 | 0.0580 | 53.83 |
|  |  | 100 mA | 0.2582 | 69.37 | 0.2413 | 67.24 | 0.0505 | 46.90 |
| After 10 Days Storage at 60 C. | 20 C. | Residual | 0.1441 | 38.70 | 0.1078 | 30.04 | 0.0001 | 0.14 |
|  |  | 25 mA | 0.1724 | 46.32 | 0.1492 | 41.57 | 0.0350 | 32.50 |
|  |  | 50 mA | 0.1566 | 42.05 | 0.1326 | 36.95 | 0.0298 | 27.63 |
|  |  | 100 mA | 0.1297 | 34.83 | 0.1018 | 28.35 | 0.0141 | 13.07 |
| After 10 Days Storage at 65 C. | 20 C. | Residual | 0.0776 | 20.83 | 0.0140 | 3.90 | 0.0014 | 1.27 |
|  |  | 25 mA | 0.0860 | 23.09 | 0.0226 | 6.30 | 0.0124 | 11.47 |
|  |  | 50 mA | 0.0451 | 12.10 | 0.0090 | 2.52 | 0.0032 | 2.93 |
|  |  | 100 mA | 0.0108 | 2.91 | 0.0046 | 1.29 | 0.0044 | 4.12 |

TABLE 3C

Discharge performance of MCMB-$LiNiCoO_2$ cells comprising fluoroester-based electrolytes after being subjected to high temperature storage periods (55° C. to 65° C.).

|  |  |  | 1.0M LiPF6 EC + EMC + ETFA (20:60:20 v/v %) | | 1.0M LiPF6 EC + EMC + TFEB (20:20:60 v/v %) | |
|---|---|---|---|---|---|---|
|  |  |  | Ah | % of initial | Ah | % of initial |
| Prior to Storage Tests | 20 C. | 25 mA | 0.2382 | 100.00 | 0.2624 | 100.00 |
|  |  | 50 mA | 0.2267 | 95.15 | 0.2209 | 84.17 |
|  |  | 100 mA | 0.2009 | 84.32 | 0.646 | 24.61 |
| After 10 Days | 20 C. | Residual | 0.0208 | 8.75 | 0.1117 | 42.57 |
|  |  | 25 mA | 0.1130 | 47.44 | 0.1505 | 57.34 |

TABLE 3C-continued

Discharge performance of MCMB-LiNiCoO$_2$ cells comprising fluoroester-based electrolytes after being subjected to high temperature storage periods (55° C. to 65° C.).

| | | | 1.0M LiPF6 EC + EMC + ETFA (20:60:20 v/v %) | | 1.0M LiPF6 EC + EMC + TFEB (20:20:60 v/v %) | |
|---|---|---|---|---|---|---|
| | | | Ah | % of initial | Ah | % of initial |
| Storage at 55 C. After 10 Days | | 50 mA | 0.1004 | 42.13 | 0.1210 | 46.10 |
| | | 100 mA | 0.0803 | 33.71 | 0.0680 | 25.90 |
| | 20 C. | Residual | 0.00 | 0.00 | 0.0400 | 15.23 |
| | | 25 mA | 0.0281 | 11.81 | 0.0679 | 25.89 |
| Storage at 60 C. After 10 Days | | 50 mA | 0.0138 | 5.80 | 0.0386 | 14.69 |
| | | 100 mA | 0.0076 | 3.19 | 0.0127 | 4.85 |
| | 20 C. | Residual | 0.00 | 0.00 | 0.0038 | 1.43 |
| | | 25 mA | 0.0071 | 2.96 | 0.0081 | 3.08 |
| Storage at 65 C. | | 50 mA | 0.0042 | 1.76 | 0.0042 | 1.62 |
| | | 100 mA | 0.0024 | 0.99 | 0.0006 | 0.24 |

As described so far, a number embodiments comprising fluoroester-based co-solvents in Li-ion electrolytes, including trifluoroethyl butyrate (TFEB), ethyl trifluoroacetate (ETFA), trifluoroethyl acetate (TFEA), and methyl pentafluoropropionate (MPFP), were found to provide good performance over a wide range of temperatures. It is believed that these embodiments have good safety characteristics, due to their low flammability associated with their halogenated nature. Of the solvents described so far, trifluoroethyl butyrate (TFEB) was demonstrated to yield the best performance, with improved low temperature capability and high temperature resilience. In addition to the above-described embodiments, other embodiments utilizing TFEB as a co-solvent have been found by developing multi-component electrolytes which also contain non-halogenated esters, film forming additives, thermal stabilizing additives, and flame retardant additives.

Several factors may influence the low temperature performance of lithium-ion cells, including: lithium ion mobility in the electrolyte solution (electrolyte conductivity); cell design; electrode thickness; separator porosity; and separator wetting properties. Of these parameters, the electrolyte properties are presumably the most dominant, in that sufficient conductivity is a necessary condition for good performance at low temperatures. In designing electrolytes with high conductivity at low temperatures, the solvents should possess a combination of several critical properties, such as: high dielectric constant; low viscosity; and adequate coordination behavior; as well as appropriate liquid ranges and salt solubilities in the medium.

Some embodiments comprise a quaternary co-solvent that includes TFEB as well as other non-fluorinated ester co-solvents, such as methyl butyrate (MB), ethyl propionate (EP), and propyl butyrate (PB). These non-fluorinated esters may improve the low temperature performance, due to their low viscosity and melting points. Furthermore, some embodiments make use of vinylene carbonate (VC) in conjunction with fluorinated esters, with the intent of producing robust solid electrolyte interface (SEI) layers on the electrodes. VC has previously been reported to be an effective additive in improving the high temperature cycle life and storage characteristics, and is believed to sacrificially polymerize on the electrode surfaces, producing protective films preventing further electrolyte reaction at the interface.

In addition, some embodiments make use of dimethyl acetamide (DMAc) as an electrolyte additive in conjunction with fluorinated ester co-solvents, which has been demonstrated to be a thermal stabilizing agent, acting to reversibly bind with PF$_5$, preventing LiPF$_6$ and carbonate solvents from decomposition at high temperature. It is envisioned that the use of VC, DMAc, or both, may improve the life characteristics and high temperature resilience of electrolyte formulations that also contain fluorinated ester co-solvents, which may impart improved operating temperature range and safety.

Embodiments may also include other fluorinated ester co-solvents in addition to the ones previously investigated, such as 2,2,2-trifluoroethyl propionate (C5H7F3 or CH3CH2CO2CH2CF3), referred to as TFEP. These new electrolyte formulations were compared with the previously described solutions, namely 1.0 M LiPF$_6$ in EC+EMC+TFEB (20:60:20 v/v %) and 1.0 M LiPF$_6$ in EC+EMC (20:80 v/v %), which were treated as baseline solutions. Accordingly, the following electrolytic solutions were prepared and evaluated:

1.0 M LiPF$_6$ in EC+EMC+TFEB+MB (20:40:20:20 v/v %);

1.0 M LiPF$_6$ in EC+EMC+TFEB+EP (20:40:20:20 v/v %);

1.0 M LiPF$_6$ in EC+EMC+TFEB+PB (20:40:20:20 v/v %);

1.0 M LiPF$_6$ in EC+EMC+TFEB (20:60:20 v/v %)+1.5% VC;

1.0 M LiPF$_6$ in EC+EMC+TFEB (20:60:20 v/v %)+1.5% DMAc;

1.0 M LiPF$_6$ in EC+EMC+TFEB (20:75:5 v/v %);

1.0 M LiPF$_6$ in EC+EMC+TFEP (20:60:20 v/v %); and 1.0 M LiPF$_6$ in EC+EMC+TFEP (20:40:40 v/v %).

These were compared with 1.0 M LiPF$_6$ in EC+EMC+TFEB (20:60:20 v/v %) and 1.0 M LiPF$_6$ in EC+EMC (20:80 v/v %), which served as baselines.

In addition to the embodiments described above, some embodiments comprising TFEB may also comprise flame retardant additives, such as triphenyl phosphate, triethyl phosphate, tributyl phosphate, and bis-(2,2,2-trifluoroethyl) methyl phosphonate, to reduce the flammability of the electrolytes.

Lithium-ion batteries with MCMB carbon anodes and LiNi$_{0.8}$CO$_{0.2}$O$_2$ cathodes were fabricated with the electrolytes listed above, and measurements related to the cells are provided in Table 4. As shown in Table 4, all cells with the formulations listed above displayed good reversibility at room temperature, and relatively minimal reactivity during the formation cycling. The high coulombic efficiency and comparable irreversible capacity losses are believed to be indirectly related to the overall stability of the solutions and the electrode filming characteristics.

Note that the fluoroester-based solutions do not display deleterious effects that limit the reversible capacity or hinder the kinetics of the lithium intercalation and de-intercalation processes. From the formation data, it may be observed that: the trifluoroethyl butyrate solutions appear to produce more desirable surface films compared with trifluoroethyl propionate, as suggested by the lower cumulative irreversible capacity losses and higher efficiency values; with regard to the quaternary formulations comprising non-fluorinated ester co-solvents, propyl butyrate displayed the most desirable filming attributes, suggesting enhanced stability compared to methyl butyrate and ethyl propionate; vinylene carbonate appears to be an effective film forming agent, leading to stable cells with low irreversible capacity loss and high efficiency; and DMAc appears to have some reactivity during the formation cycling.

TABLE 4

Charge-discharge characteristics of embodiment lithium-ion cells comprising various electrolytes subjected to formation cycling.

| Electrolyte Type | Charge Capacity (Ah) 1st Cycle | Discharge Capacity (Ah) 1st Cycle | Irreverisible Capacity (1st Cycle) | Couloumbic Efficiency (1st Cyle) | Charge Capacity (Ah) 5th Cycle | Reversible Capacity (Ah) 5th Cycle | Cummulative Irreverisible Capacity (1st-5th Cycle) | Couloumbic Efficiency (5th Cycle) |
|---|---|---|---|---|---|---|---|---|
| 1.0 M $LiPF_6$ EC + EMC (20:80 v/v %) | 0.4682 | 0.4044 | 0.064 | 86.39 | 0.4013 | 0.3914 | 0.1136 | 97.53 |
| 1.0 M $LiPF_6$ EC + EMC + TFEB (20:60:20 v/v %) | 0.51793 | 0.44202 | 0.076 | 85.34 | 0.43826 | 0.43123 | 0.1140 | 98.40 |
| 1.0 M $LiPF_6$ EC + EMC + TFEB (20:75:5 v/v %) | 0.52311 | 0.44761 | 0.076 | 85.57 | 0.44588 | 0.43613 | 0.1238 | 97.81 |
| 1.0 M $LiPF_6$ EC + EMC + TFEB + MB (20:40:20:20 v/v %) | 0.49027 | 0.41108 | 0.079 | 83.85 | 0.40770 | 0.39872 | 0.1261 | 97.80 |
| 1.0 M $LiPF_6$ EC + EMC + TFEB + EP (20:40:20:20 v/v %) | 0.48521 | 0.40316 | 0.082 | 83.09 | 0.40625 | 0.39724 | 0.1282 | 97.78 |
| 1.0 M $LiPF_6$ EC + EMC + TFEB + PB (20:40:20:20 v/v %) | 0.46187 | 0.39214 | 0.070 | 84.90 | 0.38955 | 0.38170 | 0.1128 | 97.99 |
| 1.0 M $LiPF_6$ EC + EMC + TFEB (20:60:20 v/v %) + 1.5% VC | 0.49797 | 0.42529 | 0.073 | 85.40 | 0.41434 | 0.40711 | 0.1088 | 98.25 |
| 1.0 M $LiPF_6$ EC + EMC + TFEB (20:60:20 v/v %) + 1.5% DMAc | 0.51540 | 0.43330 | 0.082 | 84.07 | 0.43093 | 0.41485 | 0.1553 | 96.27 |
| 1.0 M LiPF6 EC + EMC + TFEP (20:60:20 v/v %) | 0.49419 | 0.41287 | 0.081 | 83.54 | 0.41866 | 0.40341 | 0.1518 | 96.36 |
| 1.0 M LiPF6 EC + EMC + TFEP (20:40:40 v/v %) | 0.45809 | 0.37293 | 0.085 | 81.41 | 0.37525 | 0.35896 | 0.1604 | 95.66 |

Figure 7:
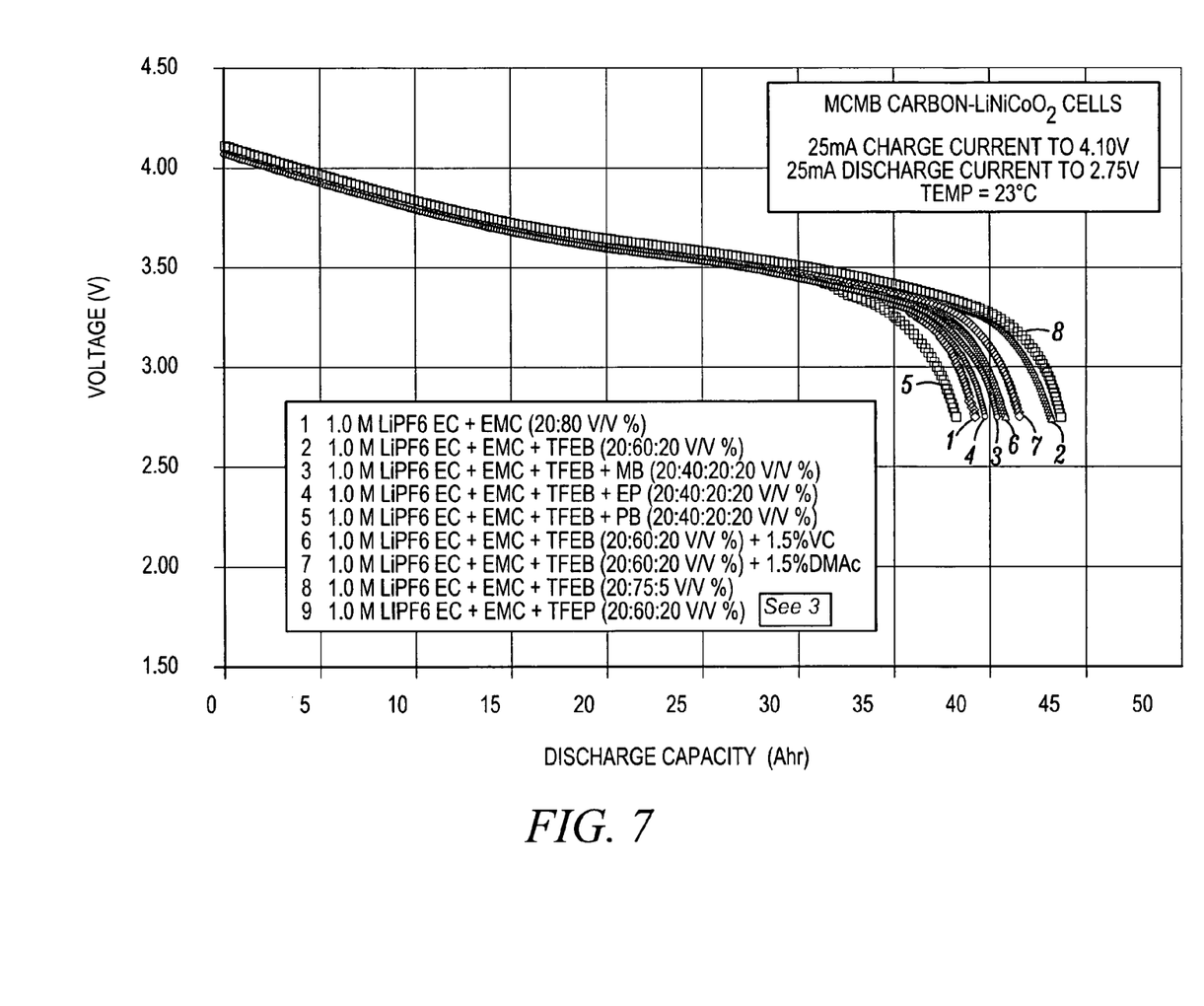

FIG. 7 illustrates discharge curves for the above displayed electrolytes. In FIG. 7, curves 3, 4, 6, and 9 are very close to each other, and it may be difficult to distinguish them from each other. (Curve 9 is on top of curve 3, and consequently the numeric label 9 is not shown among the curves.) As shown in FIG. 7, good reversibility was observed with the cells comprising these electrolyte variations, when compared after the formation cycling. It should be noted that some variation in capacity was due to different electrode weights, and not electrolyte type.

Figure 8:
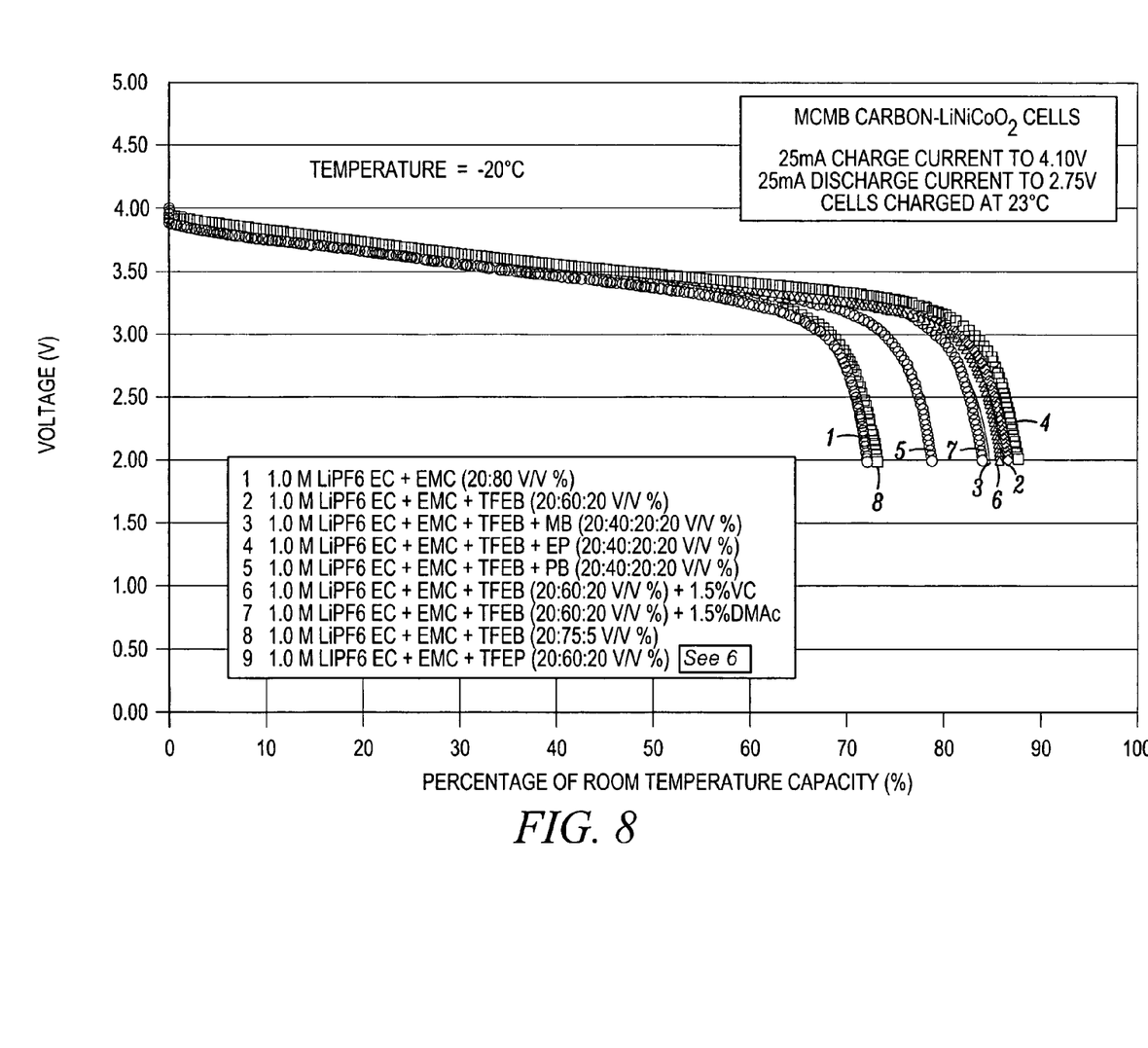

FIG. 8 shows discharge curves at −20° C. Good low temperature performance was generally observed, and was somewhat comparable to the baseline all-carbonate electrolyte. The best performance at −20° C. was exhibited by the cell comprising the EC+EMC+TFEB+EP electrolyte, demonstrating that improved low temperature performance may be obtained with fluorinated and non-fluorinated ester blends, and it may be guessed that further optimization of multi-component carbonate and ester blended electrolytes may yield further improvement in low temperature performance.

Figure 9:
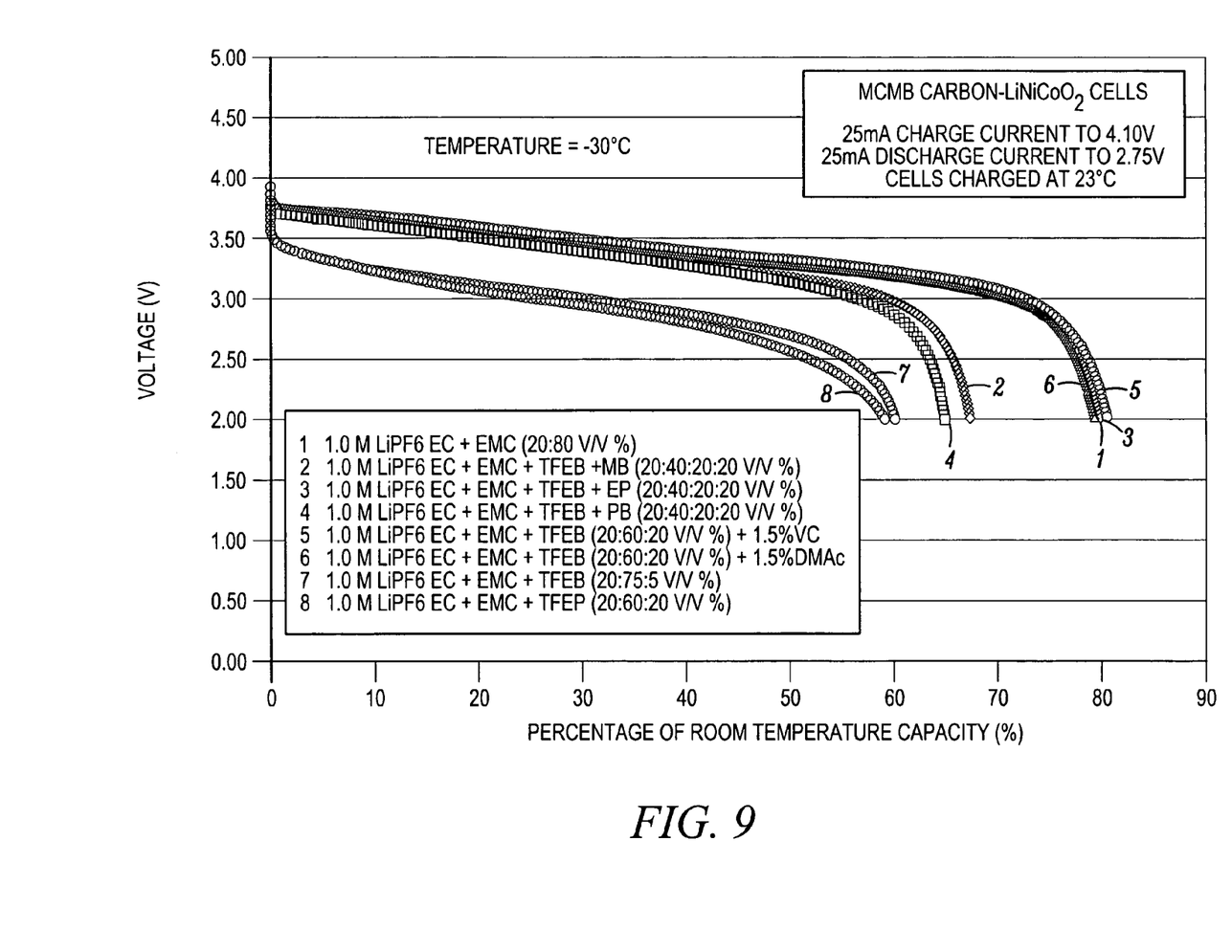
Figure 10:
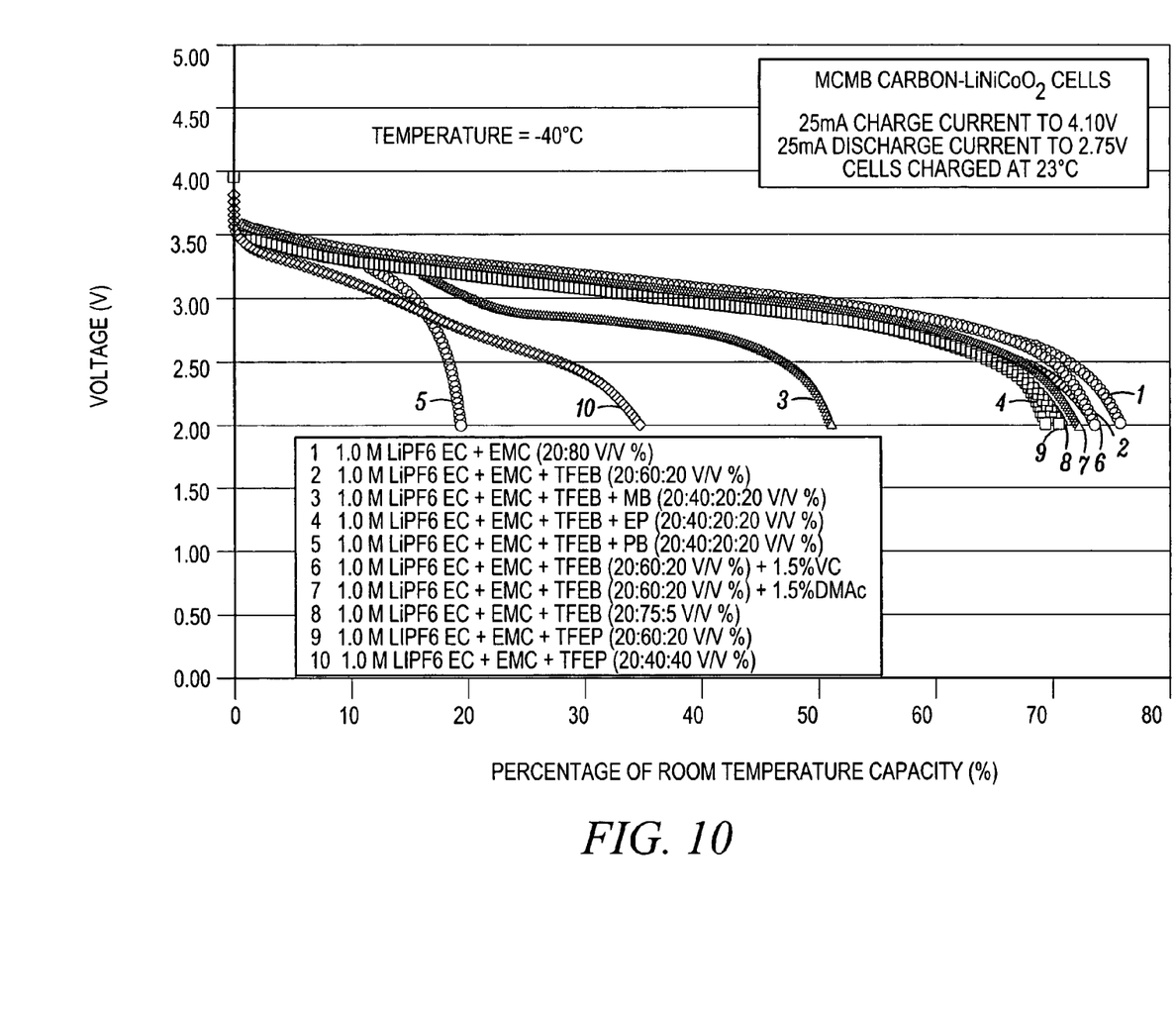

When the cells described were evaluated at −30° C., as shown in FIG. 9, good performance was again obtained with the cells comprising the fluorinated ester co-solvents. Note that the cells comprising the EC+EMC+TFEB (20:60:20) electrolyte with either VC or DMAc, or the EC+EMC+TFEB+EP (20:60:20) electrolyte, performed comparable to the baseline EC+EMC (20:80) electrolyte, with all cells providing about 79% to 80% of the room temperature capacity at −30° C. Many cells also performed well at −40° C., with about 69% to 74% of the room temperature capacity being delivered at a discharge rate of about C/16, as shown in FIG. 10.

A number of test cells with lithium-ion electrolytes comprising fluorinated ester co-solvents, including trifluoroethyl butyrate (TFEB) and trifluoroethyl propionate (TFEP), were tested, with their performance described in this specification. These electrolytes were found to deliver good performance over a wide temperature range in experimental lithium-ion cells. The general approach taken in the development of these electrolyte formulations was to optimize the type and composition of the co-solvents in ternary and quaternary solutions, focusing upon adequate stability (e.g., EC content for anode passivation, and EMC content for lowering the viscosity and widening the temperature range, while still providing good stability), enhancing the inherent safety characteristics (incorporation of fluorinated esters), and widening the temperature range of operation (the use of both fluorinated and non-fluorinated esters). Furthermore, the use of electrolyte additives, such as VC (SEI promoter) and DMAc (thermal stabilizing additive), are envisioned to provide enhanced high temperature life characteristics. For some embodiments, the concentrations of VC and DMAc may be relatively low, such as for example in the range of 0.10% and 5.0% by weight. It is anticipated that embodiment electrolyte solutions may offer improved performance when incorporated into hermitically sealed, large capacity, prototype cells, especially if all electrolyte components are highly pure.

Various modifications may be made to the described embodiments without departing from the scope of the invention as claimed below. For example, other non-fluorinated ester co-solvents that may be used are: methyl propionate, methyl acetate, ethyl acetate, propyl acetate, ethyl butyrate, butyl butyrate, and propyl propionate. Furthermore, it should be appreciated that experimental results were described for embodiments with specific concentrations of the co-solvents, but embodiments are not limited to these specific concentrations. For example, for some embodiments the EC content may vary from 10% to 50%, the EMC content may vary from 10% to 80%, the fluorinated ester co-solvent content may vary from 5% to 80%, and the non-fluorinated ester co-solvent content may vary from 10% to 80%. Furthermore, for some embodiments the lithium salt concentration (e.g., $LiPF_6$) may vary from 0.50 M to 1.50 M.

These concentration ranges are merely given to provide examples, and some embodiments may have different ranges of concentrations. For example, the lithium salt concentration may be between 0.80 M and 1.20 M, where very low temperature performance benefits from the lower end of this range, and where more moderate temperature and high power applications may benefit from the higher end of this range. As another example, the concentration of the non-fluorinated esters may be in the range of 10% to 80%.

Throughout the description of the embodiments, various mathematical relationships are used to describe relationships among one or more quantities. These relationships are in practice not satisfied exactly, and should therefore be interpreted as "designed for" relationships. One of ordinary skill in the art may design various working embodiments to satisfy various mathematical relationships, but these relationships can only be met within the tolerances of the technology available to the practitioner.

Accordingly, in the following claims, it is to be understood that claimed mathematical relationships can in practice only be met within the tolerances or precision of the technology available to the practitioner, and that the scope of the claimed subject matter includes those embodiments that substantially satisfy the mathematical relationships so claimed.

What is claimed is:

1. A battery comprising:
   an anode;
   a cathode; and
   a lithium-ion electrolyte comprising a solvent and a lithium salt dissolved in the solvent, the solvent comprising a combination of:
   ethylene carbonate having a volume-volume percentage concentration varying from 10% to 50%;
   ethyl methyl carbonate having a volume-volume percentage concentration varying from 10% to 80%; and
   a fluorinated ester co-solvent having a volume-volume percentage concentration of at least 20% and up to 80%, wherein the combination is such that the battery retains greater capacity at a temperature of −20° C. or below, as compared to a battery comprising an all carbonate based electrolyte.

2. The battery as set forth in claim 1, wherein the lithium salt has a molarity concentration varying from 0.50 M to 1.50 M.

3. The battery as set forth in claim 1, the fluorinated ester co-solvent comprising one or more co-solvents selected from the group consisting of trifluoroethyl butyrate, ethyl trifluoroacetate, trifluoroethyl acetate, methyl pentafluoropropionate, and 2,2,2-trifluoroethyl propionate.

4. The battery as set forth in claim 1,
   the anode comprising one or more compounds selected from the group consisting of mesocarbon microbeads (MCMB), carbon, and graphite; and
   the cathode comprising one or more compounds selected from the group consisting of $LiNiCoAlO_2$, $LiPO_4$, $LiMn_xO_4$, $LiFePO_4$, $LiNi_yCo_zMn_uO_2$, where x, y, z, and u denote variable stoichiometries.

5. The battery as set forth in claim 1, the lithium salt comprising one or more salts selected from the group consisting of lithium hexafluorophosphate ($LiPF_6$), lithium tetrafluoroborate ($LiBF_4$), lithium bis(oxalato) borate (LiBOB, or $LiB(C_2O_4)_2$), lithium hexafluoroarensate ($LiAsF_6$), lithium perclorate ($LiClO_4$), lithium trifluoromethanesulfonate ($LiCF_3SO_3$), and lithium bistrifluoromethanesulfonate sulfonyl imide ($LiN(SO_2CF_3)_2$).

6. The battery as set forth in claim 1, the solvent further comprising one or more non-fluorinated ester co-solvents selected from the group consisting of methyl butyrate, ethyl propionate, propyl butyrate, methyl propionate, methyl acetate, ethyl acetate, propyl acetate, ethyl butyrate, butyl butyrate, and propyl propionate.

7. The battery as set forth in claim 6, the one or more non-fluorinated ester co-solvents having the volume-volume percentage concentration varying from 20% to 80% and wherein:
   the anode comprises carbon, and
   the greater battery capacity is at temperatures of −40° C. and −60° C.

8. The battery as set forth in claim 6, the solvent further comprising one or more electrolyte additives selected from the group consisting of vinylene carbonate and dimethyl acetamide.

9. The battery as set forth in claim 8, the one or more electrolyte additives in the solvent having a concentration varying from 0.1% to 5.0% by weight.

10. The battery of claim 1, wherein the anode comprises mesocarbon microbeads carbon.

11. The battery of claim 1, wherein the fluorinated ester co-solvent is ethyl trifluoroacetate.

12. The battery of claim 1, wherein the fluorinated ester co-solvent is trifluoroethyl butyrate.

13. The battery of claim 1, wherein the combination is such that the battery retains greater reversible capacity after storage at 55° C. as compared to a battery comprising an electrolyte that is a binary baseline formulation of ethylene carbonate and ethyl methyl carbonate.

14. The battery of claim 1, wherein the combination is such that the battery provides at least 79% of room temperature capacity at the temperature of −30° C.

15. The battery of claim 1, wherein the fluorinated ester co-solvent has the volume-volume percentage concentration of 20-60%.

16. A lithium-ion electrolyte comprising a solvent and a lithium salt dissolved in the solvent, the solvent comprising a combination of:
   ethylene carbonate having a volume-volume percentage concentration varying from 10% to 50%;
   ethyl methyl carbonate having a volume-volume percentage concentration varying from 10% to 80%; and
   a fluorinated ester co-solvent having a volume-volume percentage concentration of at least 20% and up to 80%, wherein the combination is such that the electrolyte provides a battery with greater capacity at a temperature of −40° or below, as compared to an all carbonate based electrolyte.

17. The lithium-ion electrolyte as set forth in claim 16, wherein the lithium salt has a molarity concentration varying from 0.50 M to 1.50 M.

18. The lithium-ion electrolyte as set forth in claim 16, the fluorinated ester cosolvent comprising one or more co-solvents selected from the group consisting of 2,2,2-trifluoroethyl butyrate, ethyl trifluoroacetate, trifluoroethyl acetate, methyl pentafluoropropionate, and 2,2,2-trifluoroethyl propionate.

19. The lithium-ion electrolyte as set forth in claim 16, the lithium salt comprising one or more salts selected from the group consisting of lithium hexafluorophosphate ($LiPF_6$), lithium tetrafluoroborate ($LiBF_4$), lithium bis(oxalato) borate (LiBOB, or $LiB(C_2O_4)_2$), lithium hexafluoroarensate (LiAsF6), lithium perclorate (LiClO4), lithium trifluoromethanesulfonate ($LiCF_3SO_3$), and lithium bistrifluoromethanesulfonate sulfonyl imide ($LiN(SO_2CF_3)_2$).

20. The lithium-ion electrolyte as set forth in claim 16, the solvent further comprising one or more non-fluorinated ester co-solvents selected from the group consisting of methyl butyrate, ethyl propionate, propyl butyrate, methyl propionate, methyl acetate, ethyl acetate, propyl acetate, ethyl butyrate, butyl butyrate, and propyl propionate.

21. The lithium-ion electrolyte as set forth in claim 20, further comprising:
a cathode; and
an anode including carbon; and wherein:
the one or more non-fluorinated ester co-solvents have the volume-volume percentage concentration varying from 20% to 80% and
the greater battery capacity is at the temperatures of −40° C. and −60° C.

22. The lithium-ion electrolyte as set forth in claim 20, the solvent further comprising one or more electrolyte additives selected from the group consisting of vinylene carbonate and dimethyl acetamide.

23. The lithium-ion electrolyte as set forth in claim 22, the one or more electrolyte additives in the solvent having a concentration varying from 0.1% to 5.0% by weight.

24. The electrolyte of claim 16, wherein the fluorinated ester co-solvent is ethyl trifluoroacetate.

25. The electrolyte of claim 16, wherein the fluorinated ester co-solvent is trifluoroethyl butyrate.

26. The electrolyte of claim 16, wherein the combination is such that the battery retains greater reversible capacity after storage at 55° C. as compared to a battery comprising an electrolyte that is a binary baseline formulation of ethylene carbonate and ethyl methyl carbonate.

27. The electrolyte of claim 16, wherein the combination is such that the electrolyte provides the battery with at least 79% of room temperature capacity at the temperature of −30° C.

28. The electrolyte of claim 16, wherein the fluorinated ester co-solvent has the volume-volume percentage concentration of 20-60% or 20-80% and the greater battery capacity is over a temperature range of −40° C. to −60° C.

29. A method of fabricating a lithium-ion electrolyte, comprising:
providing a solvent and a lithium salt dissolved in the solvent, wherein the solvent comprises a combination of:
ethylene carbonate having a volume-volume percentage concentration varying from 10% to 80%;
ethyl methyl carbonate having a volume-volume percentage concentration varying from 10% to 80%; and
a fluorinated ester co-solvent having a volume-volume percentage concentration of at least 20% and up to 80%, wherein the combination is such that the electrolyte provides a battery with greater capacity at a temperature of −40° C., as compared to an all carbonate based electrolyte.

30. The method of claim 29, further comprising providing an anode and a cathode, wherein:
the fluorinated ester co-solvent has the volume-volume percentage concentration of 20%-60%,
the greater battery capacity is over a temperature range of −40° C. to −60° C., and
the anode comprises carbon.

* * * * *